United States Patent
Manneh et al.

(10) Patent No.: US 7,344,153 B1
(45) Date of Patent: Mar. 18, 2008

(54) MULTIPLE SENSOR CONTROLLED VEHICLE AIRBAG DEPLOYMENT SYSTEM

(76) Inventors: Dimitri J. Manneh, 219 S. Solomon Dr., Anaheim Hills, CA (US) 92807; Nicholas R. Mayo, 1657 Gates Ave., Manhattan Beach, CA (US) 90266

( * ) Notice: Subject to any disclaimer, the term of this patent is extended or adjusted under 35 U.S.C. 154(b) by 283 days.

(21) Appl. No.: 11/183,012

(22) Filed: Jul. 18, 2005

(51) Int. Cl.
*B60R 21/16* (2006.01)

(52) U.S. Cl. .................................... 280/735

(58) Field of Classification Search ............ 280/735, 280/736, 741; 701/45
See application file for complete search history.

(56) References Cited

U.S. PATENT DOCUMENTS

| | | | | |
|---|---|---|---|---|
| 5,209,510 A | * | 5/1993 | Mamiya | 280/732 |
| 5,626,359 A | * | 5/1997 | Steffens et al. | 280/735 |
| 6,142,519 A | * | 11/2000 | Smith | 280/741 |
| 6,305,709 B1 | * | 10/2001 | Okada | 280/735 |
| 6,532,408 B1 | | 3/2003 | Breed | |
| 6,581,961 B1 | * | 6/2003 | Bowers | 280/735 |
| 6,587,042 B2 | * | 7/2003 | Tabata et al. | 340/432 |
| 6,615,122 B1 | * | 9/2003 | Yamashita | 701/45 |
| 6,662,092 B2 | | 12/2003 | Wang et al. | |
| 6,784,379 B2 | | 8/2004 | Breed et al. | |
| 6,851,373 B2 | * | 2/2005 | Quioc | 102/530 |
| 2005/0029781 A1 | * | 2/2005 | Enders et al. | 280/732 |

FOREIGN PATENT DOCUMENTS

EP 1331142 A2 * 7/2003

* cited by examiner

*Primary Examiner*—Paul N. Dickson
*Assistant Examiner*—Robert A. Coker
(74) *Attorney, Agent, or Firm*—Crossley Patent Law; Mark Ashley Crossley

(57) ABSTRACT

A multiple sensor controlled vehicle airbag deployment system, the system having from one to a plurality of airbags, each airbag with multiple inflation cartridges, each cartridge with a conductive strip whereby the CPU of the system determines not only the number of cartridges to be fired per airbag, based upon multiple informational sensors, but also whether or not the correct number of cartridges fired, the system firing more cartridges if not, each airbag further comprised of more cartridges than needed for any single collision event, thereby protecting in more than one collision.

3 Claims, 3 Drawing Sheets

MULTIPLE SENSOR CONTROLLED VEHICLE AIRBAG DEPLOYMENT SYSTEM

BACKGROUND OF THE INVENTION

Airbags currently used in the automotive industry have only one or two levels of deployment, also referred to as volume of air, with little to no regard to what is in the seat related to that airbag. Excessively violent deployment is therefore the norm, even when not desired. Consequently, bodily harm and injuries have been prevalent in airbag deployment. Injuries range from a broken nose, to burns, to paralysis, and even to death. Deaths are not uncommon due to airbags violently deploying in relation to a child passenger. Additionally, current airbag systems are not capable of multiple inflations and are thereby incapable of protecting vehicle passengers from multiple collisions until the system is serviced.

FIELD OF THE INVENTION

The invention relates to control mechanisms for deploying airbags in vehicle crash events and more specifically to an airbag control system which utilizes multiple sensors and inflation cartridges in controlling vehicle airbag deployment.

SUMMARY OF THE INVENTION

The general purpose of the multiple sensor controlled vehicle airbag deployment system, described subsequently in greater detail, is to provide a multiple sensor controlled vehicle airbag deployment system which has many novel features that result in an improved multiple sensor controlled vehicle airbag deployment system which is not anticipated, rendered obvious, suggested, or even implied by prior art, either alone or in combination thereof.

To accomplish this, the invention comprises multiple sensors. The sensors detect passenger weight, distance of occupant from an interior vehicle object or surface, angle of the passenger's seatback, use of seatbelt, speed of the vehicle, and force of an impact. A vehicle may be equipped with a plurality of airbags. Airbags may be positioned in front of passengers, beside passengers, and even both in front and beside passengers. The invention utilizes multiple inflation cartridges for each airbag.

The multiple cartridges provide variable airbag inflation. The multiple cartridges also provide backup cartridges that may be needed to insure the safety of a passenger in the event of multiple collisions. All cartridges do not fire in one single collision event. The invention offers passenger protection from multiple collisions whether within one multiple collision crash event or collisions separated by greater time lapse. The invention is therefore capable of protecting a vehicle passenger more than once without requiring airbag system service first. The second-strike capability of the system is valuable feature in that multiple collisions are possible prior to a vehicle being serviced. The invention further utilizes a feedback system to insure proper airbag inflation. The feedback system determines if the number of cartridges signaled to fire by the processor actually fired. If not, the feedback system provides for the processor to fire more cartridges to insure proper airbag inflation to match the collision event.

In the event of a collision, the sensors provide information to the CPU, known as the computer processing unit, central processing unit, or control processing unit. The CPU determines how many cartridges to fire, as well as which airbag cartridges to fire. For example, a side collision causes the CPU to direct cartridges in an airbag beside a passenger to fire. A frontal collision causes the CPU to fire a forwardly positioned airbag with the appropriate number of cartridges. The feedback system is signaled by each cartridge. The conductive strip of each cartridge fired is severed, thereby signaling the CPU whether or not the cartridge fired. The CPU processes this information, and, if the correct number of cartridges did not fire, causes more cartridges to fire.

This process of feedback continues until the correct numbers of cartridges have fired. A plurality of cartridges for each airbag is reserved. The CPU resets the system, in case of a multiple collision event, or for a future collision.

Thus has been broadly outlined the more important features of the multiple sensor controlled vehicle airbag deployment system so that the detailed description thereof that follows may be better understood and in order that the present contribution to the art may be better appreciated.

Numerous objects, features and advantages of the multiple sensor controlled vehicle airbag deployment system will be readily apparent to those of ordinary skill in the art upon reading the following detailed description of presently preferred, but nonetheless illustrative, examples of the multiple sensor controlled vehicle airbag deployment system when taken in conjunction with the accompanying drawings. In this respect, before explaining the current examples of the multiple sensor controlled vehicle airbag deployment system in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the multiple sensor controlled vehicle airbag deployment system. It is therefore important that the claims be regarded as including such equivalent constructions insofar as they do not depart from the spirit and scope of the present invention.

Objects of the multiple sensor controlled vehicle airbag deployment system, along with various novel features that characterize the invention are particularly pointed out in the claims forming a part of this disclosure. For better understanding of the multiple sensor controlled vehicle airbag deployment system, its operating advantages and specific objects attained by its uses, refer to the accompanying drawings and description.

DETAILED DESCRIPTION OF THE DRAWINGS

With reference now to the drawings, and in particular FIGS. 1 through 5 thereof, example of the multiple sensor controlled vehicle airbag deployment system employing the principles and concepts of the present invention and generally designated by the reference number 10 will be described.

Figure 5:
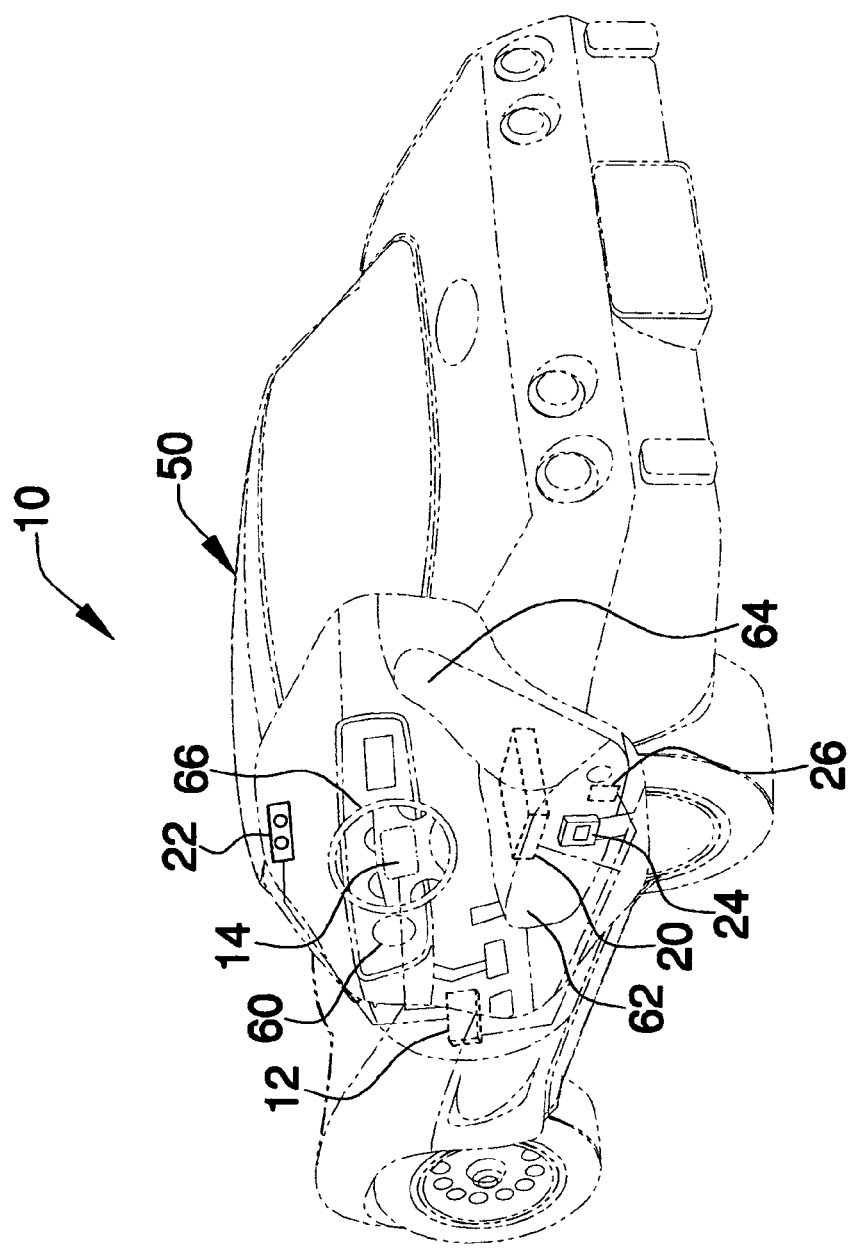
FIG. 5 is a perspective view of the invention installed in a vehicle.

Referring to FIG. 5, the invention 10 comprises a CPU 12 mounted within the vehicle 50. The CPU 12 may be mounted in a plurality of locations. The CPU is powered by the vehicle 50 electrical system. At least one occupant weight sensor 20 is mounted within a seat bottom 62 of the vehicle 50. Multiple seat bottoms 62 may call for multiple occupant weight sensors 20. The weight sensor 20 detects both presence of a passenger and passenger weight. At least one occupant distance sensor 22 is installed in the vehicle 50. The distance sensor 22 reads at least one occupant's distance from interior surfaces of the vehicle 50. Distances can be read from steering wheels, dashboards, door panels, seatback rears, and other interior surfaces. At least one seatbelt sensor 24 detects whether or not an occupied seatbelt is fastened. Seatbelt sensors 24 may be used for a plurality of seats within a vehicle 50. A seatback angle sensor 26 detects the angle of an occupied seatback 64. A seatback angle sensor 26 may be used for each seatback 64 in a vehicle 50. A speed sensor (not shown) detects the speed of the vehicle 50 and the change of speed of the vehicle 50.

The illustrated example of the invention 10 includes the speed sensor within the CPU 12. The CPU 12 may also derive speed information from the speedometer 60 of the vehicle 50. At least one airbag 14 is installed within the vehicle 50. The illustrated airbag 14 installation is within the steering wheel 66 of the vehicle 50. A plurality of airbags 14 may be installed throughout a vehicle 50. Preferred airbag 14 locations are well established in the art of vehicles 50.

Figure 1:
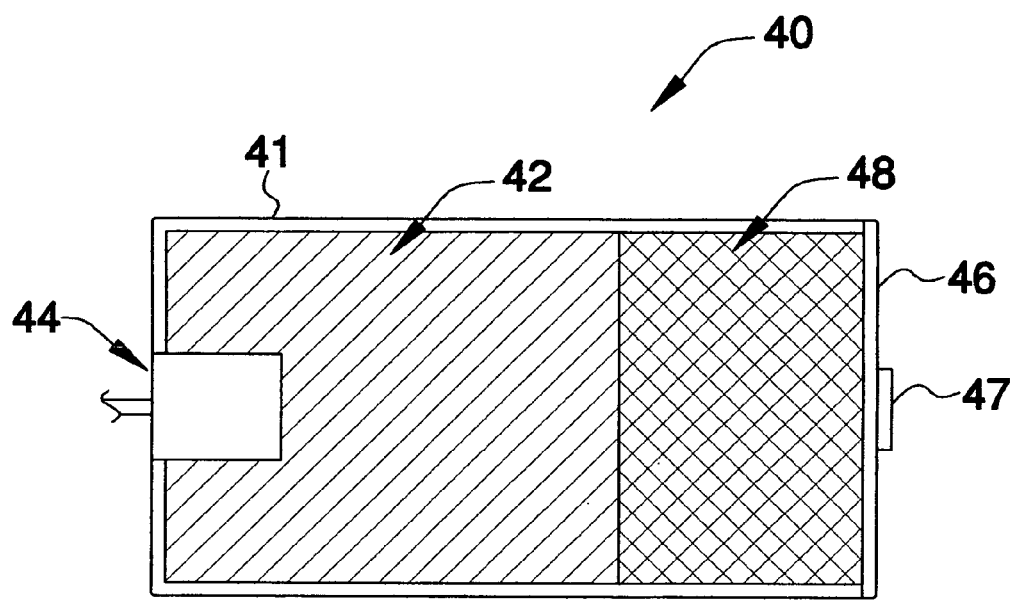
FIG. 1 is a cross sectional view of an inflation cartridge of the system.
Figure 2:
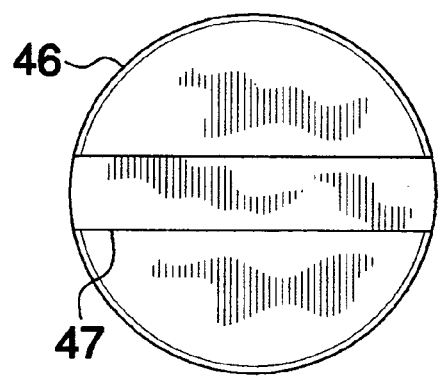
FIG. 2 is an end elevation of the seal end of the cartridge of FIG. 1.
Figure 3:
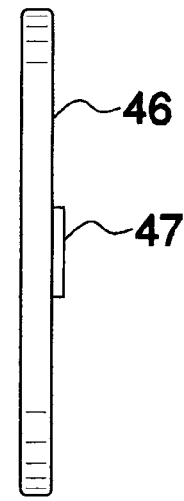
FIG. 3 is a side view of the seal and conductive strip of the cartridge.

Referring to FIGS. 1, 2, and 3, a plurality of inflation cartridges 40 are fitted to each airbag 14. The propellant 42 is within the case 41 of each cartridge 40. Propellants 42 are known in the art. A typical propellant is sodium azide which discharges nitrogen gas to fill the airbag 14. Each cartridge 40 is fitted with an igniter 44. Each igniter 44 is in communication with the CPU 12. A filter 48 is used to filter ignition elements (not shown) to prevent their discharge from the cartridge 40. Each cartridge 40 is fitted with a seal 46 at the end of each cartridge 40, the seal 46 end opposite the igniter 44 end. A conductive strip 47 is fitted across each seal 46 of each cartridge 40, whereby the conductive strip 47 is broken upon cartridge 40 firing. The CPU 12 is thereby notified when a cartridge 40 actually fires. The CPU 12 fires more cartridges 40 to fill an airbag 14 if the number of cartridges 40 to be fired by the CPU 12 is not fired. The system 10 fires an appropriate number of cartridges 40 for controlled airbag 14 inflation in a collision event. Each airbag 14 fitted with sufficient cartridges 40 for more than one collision.

Figure 4:
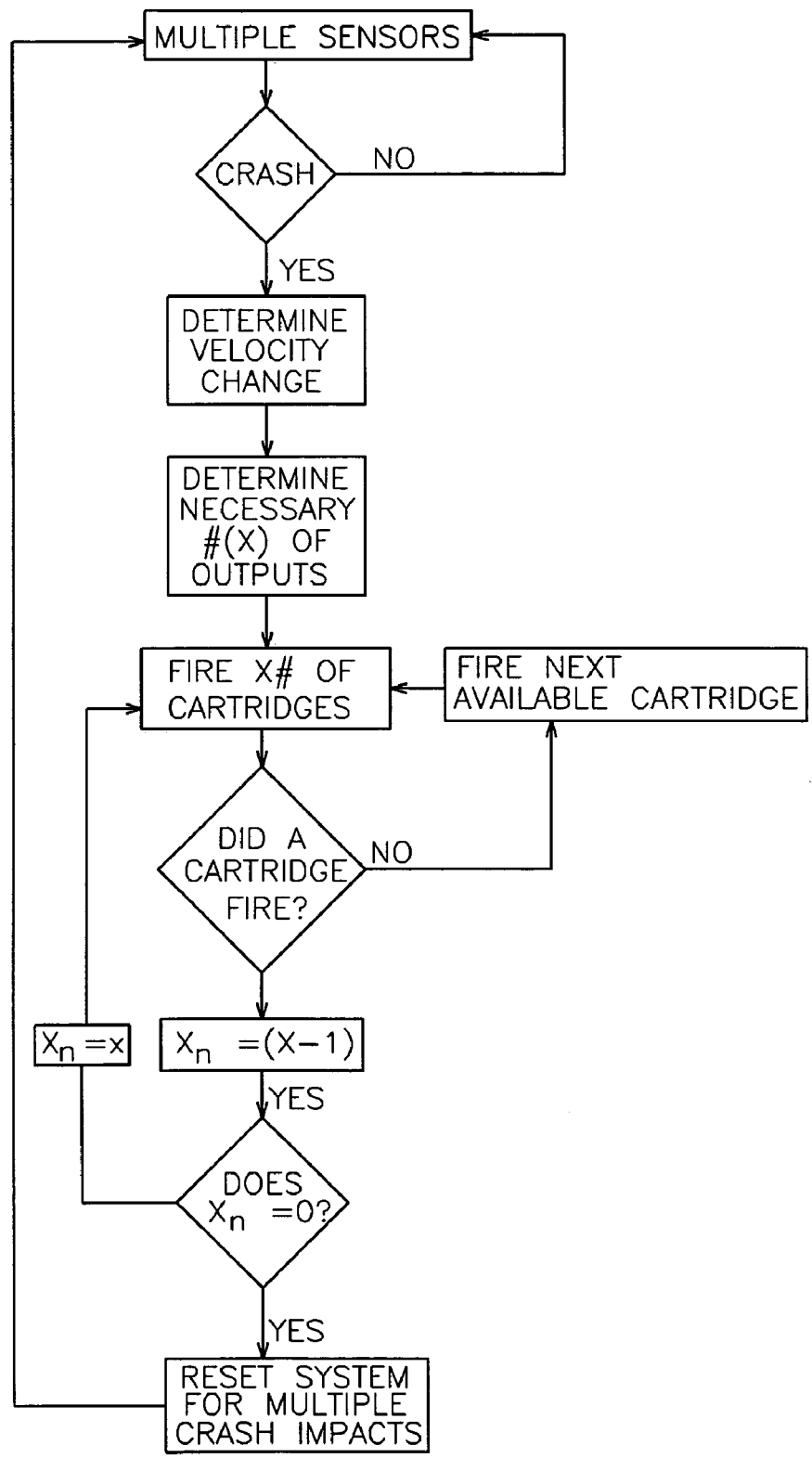
FIG. 4 is a representation of the electronic functions of the system and the feedback thereof.

Referring to FIG. 4, the invention 10 receives sensor feedback. The invention 10 determines a crash event based upon set parameters of speed change. The invention 10 uses sensor input to control the number of inflation cartridges 40 fired for a given airbag 14 within the vehicle 50. The invention 10 determines if the proper number of cartridges 40 is fired for each given airbag 14. If sufficient cartridges 40 are not fired, the CPU 12 directs additional firing of cartridges 40 until the correct number is fired. The CPU 12 instantly resets such that even multiple collisions per event offer passenger protection. By detecting passenger weight, the CPU 12 can ignite fewer inflation cartridges 40 for smaller passengers, thereby preventing violent and sometimes injurious airbag 14 inflation for smaller passengers.

With respect to the above description then, it is to be realized that the optimum dimensional relationships for the parts of the multiple sensor controlled vehicle airbag deployment system, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A multiple sensor controlled airbag and multiple cartridge airbag deployment system for protecting passengers of a vehicle in a collision, the system comprising:
   a CPU for mounting within a motor vehicle, the CPU powered by the vehicle electrical system;
   at least one occupant weight sensor for mounting within a seat bottom of the vehicle, each weight sensor for sensing the presence and weight of a passenger;
   at least one occupant distance sensor, the distance sensor for reading at least one occupant's distance from interior surfaces of the vehicle;
   at least one seatbelt sensor, each seatbelt sensor detecting whether or not an occupied seatbelt is fastened;
   a seatback angle sensor for detecting the angle of an occupied seatback;
   a speed sensor for detecting the speed of the vehicle and the change of speed of the vehicle;
   at least one airbag for installation within the vehicle;
   a plurality of inflation cartridges for each airbag;
   a propellant within each cartridge;
   an igniter of each cartridge;
   a filter for filtering ignition elements to prevent their discharge from the cartridge;
   a seal at an end of each cartridge, the seal on the end of the cartridge opposite the igniter;
   a conductive strip across each seal of each cartridge, whereby the conductive strip is broken upon cartridge firing, thereby notifying the CPU of cartridge firing,
   whereby the CPU fires more cartridges to fill an airbag if the number of cartridges to be fired by the CPU were not fired, the CPU capable of reset after each collision,
   whereby the system fires an appropriate number of cartridges for controlled airbag inflation in a collision event, each airbag fitted with sufficient cartridges for more than one collision.

2. The system in claim 1 wherein the CPU further derives information from a speedometer of the vehicle.

3. The system in claim 2 wherein the speed sensor of the vehicle is disposed within the CPU.

* * * * *